United States Patent
Manuel-Devadoss (10) Patent No.: US 9,143,815 B2
(45) Date of Patent: Sep. 22, 2015

(54) METHOD AND SYSTEM TO PROVIDE A NON-FREE DIGITAL EVENT CONTENT FROM THE CONTENT PROVIDER TO THE COMPUTING DEVICE USERS

(71) Applicant: Johnson Manuel-Devadoss, Chennai (IN)

(72) Inventor: Johnson Manuel-Devadoss, Chennai (IN)

(73) Assignee: Johnson Manuel-Devadoss, Houston, TX (US)

( * ) Notice: Subject to any disclaimer, the term of this patent is extended or adjusted under 35 U.S.C. 154(b) by 0 days.

(21) Appl. No.: 14/304,974

(22) Filed: Jun. 15, 2014

(65) Prior Publication Data

US 2014/0304721 A1    Oct. 9, 2014

Related U.S. Application Data

(63) Continuation-in-part of application No. 12/646,245, filed on Dec. 23, 2009, now Pat. No. 8,371,499.

(51) Int. Cl.

| | |
|---|---|
| *G06F 17/00* | (2006.01) |
| *H04N 21/2543* | (2011.01) |
| *H04N 21/258* | (2011.01) |
| *H04N 21/2187* | (2011.01) |
| *H04N 21/442* | (2011.01) |
| *H04N 7/16* | (2011.01) |
| *H04N 21/835* | (2011.01) |
| *G06Q 30/02* | (2012.01) |

(52) U.S. Cl.
CPC ........... *H04N 21/2543* (2013.01); *G06Q 30/02* (2013.01); *H04N 7/163* (2013.01); *H04N 21/2187* (2013.01); *H04N 21/25883* (2013.01); *H04N 21/44218* (2013.01); *H04N 21/835* (2013.01)

(58) Field of Classification Search
CPC .................... H04N 21/4542; H04N 21/44008; H04N 21/4223; H04N 21/44218; H04N 21/4532; H04N 21/4788; G06F 21/10; G06Q 30/02; H04H 60/45; H04H 60/65
USPC ......................................................... 235/375
See application file for complete search history.

(56) References Cited

U.S. PATENT DOCUMENTS

| | | | |
|---|---|---|---|
| 2002/0196159 A1* | 12/2002 | Lesenne et al. | 340/825.72 |
| 2004/0030615 A1* | 2/2004 | Ling | 705/27 |
| 2011/0154385 A1* | 6/2011 | Price et al. | 725/12 |
| 2014/0040926 A1* | 2/2014 | Maurer et al. | 725/8 |

\* cited by examiner

*Primary Examiner* — Thien M Le
*Assistant Examiner* — Tae Kim (57) ABSTRACT

Disclosed is a method and system for providing the digital content of non-free event to viewers through mobile computing devices. The present invention collects the viewer's preferred date and time, ticket count, the content provider and non-free event information. Then the present invention initiates the payment process and communicates to appropriate media server to book the tickets and download the digital content of non-free event. At the time of the event the present invention authorizes the authentication code on ticket, leverages the mobile device camera to validate the count of viewers watching the event based on count of tickets purchased and if viewers are in right age to watch the event depending on rating of the event. Then the present invention downloads the digital content of event and streams to viewer's computing device from the non-free digital event content provider.

17 Claims, 8 Drawing Sheets

METHOD AND SYSTEM TO PROVIDE A NON-FREE DIGITAL EVENT CONTENT FROM THE CONTENT PROVIDER TO THE COMPUTING DEVICE USERS

CROSS REFERENCE TO RELATED APPLICATION

In accordance with 37 C.F.R 1.76, a claim of priority is included in an Application Data Sheet filed concurrently herewith. Accordingly, under 35 U.S.C. §119(e), 120, 121, and/or 365(c) the present invention claims priority as a continuation-in-part to U.S. patent application Ser. No. 12/646,245 filed Dec. 23, 2009, entitled "Method and apparatus to provide the digital content of non-free event to the viewers and to authorize the viewers", now U.S. Pat. No. 8,371,499 and is a continuation-in-part patent application of U.S. patent application Ser. No. 12/642,409 filed Dec. 18, 2009, entitled "Method and system to provide live entertainment digital content to the home viewers". The contents of each of the above referenced applications or patents are herein incorporated by reference in its entirety.

BACKGROUND OF THE INVENTION

1. Field of the Invention

The present invention relates generally to the entertainment system, and more particularly, to providing non-free digital event content to viewers through mobile computing devices and validating the viewers count and if the viewer is allowed to watch the digital content of the event.

2. Description of the Related Art

In today's world significant importance is given to entertainment. People watch more movies and other forms of events like movies and non-free stage entertainment shows. Movies explore the edges of human emotion, freeze culture and show us how creative we can be. However most people do not preferred to watch the event in the theatre/auditorium due to a number of reasons. One of the top reasons being privacy—many prefer to avoid the crowd. They like to stay in the comfort of their home and watch entertainment thereby avoiding chatter disturbances from fellow members in the content provider example, theater or auditorium.

Time constraint also plays as an important cause. Due to fixed event timings in theater/auditorium, people are not able to make it on-time. Sometimes the events of their choice are shown only once on a particular day, thereby forcing people to make adjustments in their daily schedule to watch the particular event.

Another reason that can be attributed to is climatic conditions. During rainy/snow season, many people miss out on a number of events, as they like to stay warm indoors. People try to avoid travelling to theatre/auditorium during the cold weather season. Due to this event revenue is affected and it causes great loss for the event producers and as well as the distributors who invest a huge sum of money for the making of each event.

Sometimes when a box-office movie is released, people may be busy with work or may have traveled out-of-country for a business meeting. If people miss out when the movie is released, they have to only wait for the CD/DVD of the movie to be released before they can watch their favorite movie.

Some live event shows occur only in bigger cities. Also only box-office movies are released in all the theatres, many small budget movies either are not shown in all theatres or they may be shown only for fewer days. This causes a lot of discomfort for people not living in major cities. They would really like to see the event but are unable to do so because they may have to travel long distances, in some cases make out-of-station travels to see a particular event.

Also, the present invention provides real-time parental guidance for the event. A motion picture rating system classifies the films with regard to suitability for audiences in terms of issues such as violence, substance abuse, profanity, impudence or other types of mature content. However, there is no guarantee to protect the kids from not watching digital content that is not suitable for them. So there is a need for real-time validation while watching entertainment at home.

Accordingly, there is a need for a system for to present the digital content of non-free event to people so that they can directly receive and enjoy the event from the comfort of their home. Also there is a need for a system that is secure, reliable and easy to use.

SUMMARY OF THE INVENTION

In view of the foregoing disadvantages inherent in the prior art, the general purpose of the present invention is to provide the non-free digital event content to people to their mobile computing devices for any non-free event and to include all the advantages of the prior art, and also to overcome the drawbacks inherent therein.

The present invention takes event like movies and non-free stage entertainment shows to the comfort of viewers preferred location. The viewer can privately enjoy the event like motion-picture show or non-free stage entertainment with his/her family members at their preferred location.

The present invention provides flexibility to the viewer to watch non-free events like movies and non-free stage entertainment shows (i.e., concerts, magical shows) at his/her own convenient time in a day. The viewer chooses his/her own preferred date and time (e.g., anytime in 24 hours instead of predefined timings) at the time of ticket booking. This helps, as viewer no longer has to adjust the daily schedule to watch the event.

The present invention encourages people to watch newly released movies in all weather conditions. The viewer can book the required number of tickets online and can enjoy the event like movies and non-free stage entertainment live shows without even stepping out of their home. This aspect of the present invention greatly increases revenue for event producers and distributors. The present invention eliminates most of the traveling needed to watch entertainment.

Still another aspect of the present invention is providing real-time parental guidance for the audiences by validating if only right viewers are present for watching the entertainment by scanning the viewers and comparing with event rating present in the purchased ticket.

These together with other aspects of the present invention, along with the various features of novelty that characterize the present invention, are pointed out with particularity in the claims annexed hereto and form a part of the present invention. For a better understanding of the present invention, its operating advantages, and the specific objects attained by its uses, reference should be made to the accompanying drawings and descriptive matter in which there are illustrated exemplary embodiments of the present invention.

BRIEF DESCRIPTION OF THE DRAWINGS

The advantages and features of the present invention will become better understood with reference to the following detailed description and claims taken in conjunction with the accompanying drawings, wherein like elements are identified with like symbols, and in which:

DETAILED DESCRIPTION OF THE INVENTION

The exemplary embodiments described herein detail for illustrative purposes and are subject to many variations in structure and design. It should be emphasized, however, that the present invention is not limited to a particular method to watch non-free digital event content from theatre/auditorium, as shown and described. It is understood that various omissions and substitutions of equivalents are contemplated as circumstances may suggest or render expedient, but these are intended to cover the application or implementation without departing from the spirit or scope of the claims of the present invention. Also, it is to be understood that the phraseology and terminology used herein is for the purpose of description and should not be regarded as limiting. In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

The present invention discloses a method, system for providing the digital content of non-free event like newly released movie, stage entertainment to viewers through mobile computing devices. In addition, the present invention discloses a way to authorize the viewer's count and their age to watch the event by using mobile camera device. Thereby, present invention allows viewers to relax and enjoy the newly released movie, non-free stage entertainments at their preferred location in privacy. Thereby, the present invention increases the revenue for producer and distributors who invest huge money on events by providing round the clock event presentation as now more people can start to enjoy events on the go.

Disclosed are systems, methods, and non-transitory computer-readable storage media for providing user interface to allow the user to select the non-free digital event content from the content provider at a preferred date & time for the user to watch the event, Providing the payment interaction module to allow user to use their credit card to pay the ticket amount by swiping their credit card on the card reader extensible device, Communicating to the content provider computer to update the collected information and buys/books a ticket for the appropriate user data, validating the viewer's count and their age to watch the non-free digital event content based on the rating by capturing user(s) image using the mobile camera, Downloading and streaming the event digital content to their mobile device once the user count and their age is validated.

Figure 1:
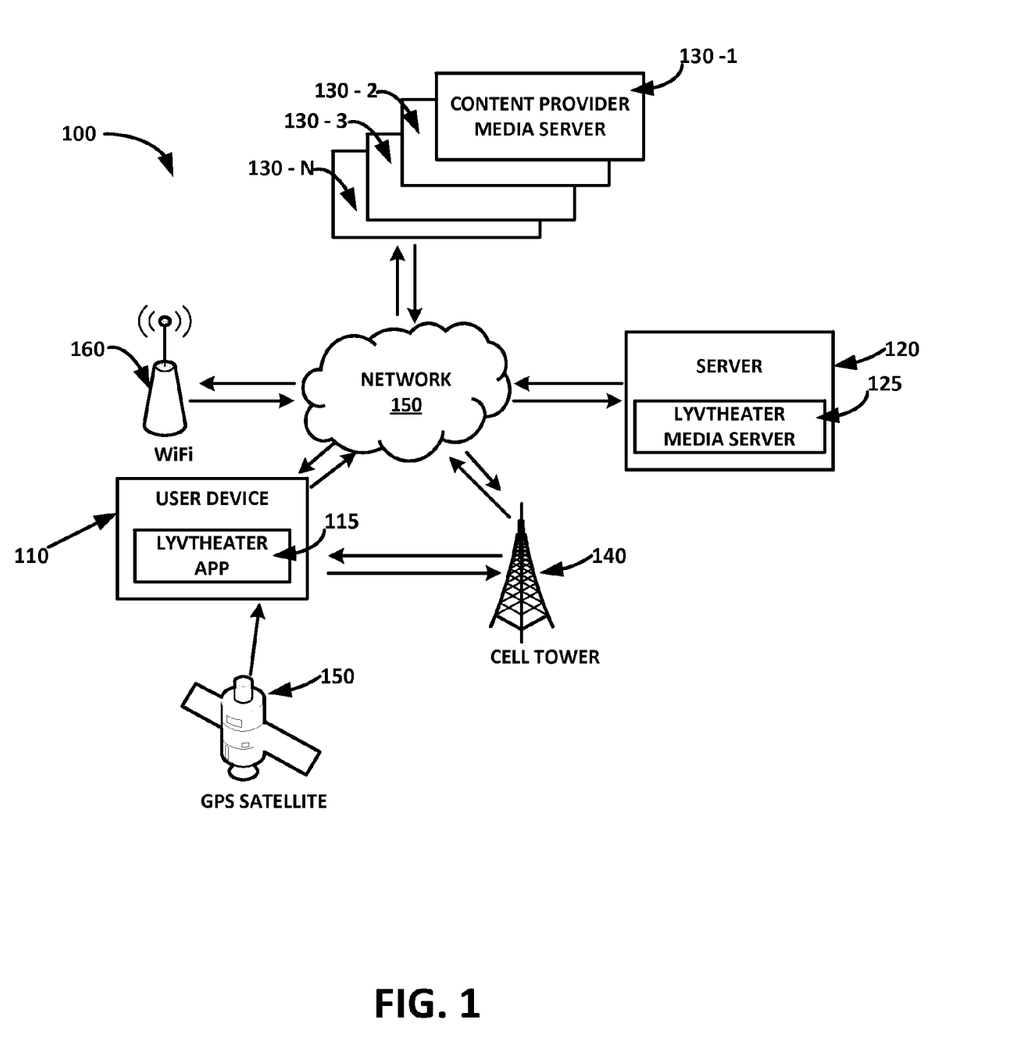
FIG. 1 is a diagram of an exemplary network in which systems and methods consistent with the principles of the invention may be implemented.

FIG. 1 is an exemplary diagram of a network 100 in which systems and methods consistent with the principles of the invention may be implemented. Network 150 may include multiple clients 110 connected to server 120, content provider media servers 130-1, 130-2, ..., 130-N via a network 150, Wifi 160 and Cell Tower 140. Clients 110, a single server 120, N servers 130 have been illustrated as connected to network 150 for simplicity. In practice, there may be more or fewer clients and servers. Also, in some instances, a client may perform a function of a server and a server may perform a function of a client.

Clients 110 may include client entities. An entity may be defined as a mobile device, such as a personal digital assistant (PDA), a tablet, an iPad, an iPhone, an Android mobile device, Blackberry, or another type of computation or communication device, a thread or process running on one of these devices, and/or an object executable by one of these devices. Servers 120, 130 may include server entities that provides non-free digital event content, ticketing process, payment processing in a manner consistent with the principles of the invention. In an implementation consistent with the principles of the invention, client device 110 may include a computer implemented program (hereafter called "LYVTHEATER APP" 115) to validate the viewers count and their age to watch the event by leveraging the camera device of the client device 110, to process the payment for the non-free digital event content, to download and stream the non-free digital event content from the content provider.

In an implementation consistent with the principles of the invention, server 120 may include a computer implemented program (hereafter called "LYVTHEATER MEDIA SERVER") 125 to validate the users and booking tickets to the content provider media servers 130 and downloading the non-free digital event content from the content provider media servers 130. The content provider media server 130 is configured to provide non-free digital event content. The content provider media servers 130 may be any combination of software agents and/or hardware modules for providing the non-free digital event content to the client devices 110 via server 120. The content provider media servers 130 may facilitate interaction and communication among users of the client devices 110 via the network 150. For example, the content provider media servers 130 may provide a platform for users of the client devices 110 who are viewers of non-free digital event content to watch it on their client device 110.

Network 150 may include a local area network (LAN), a wide area network (WAN), a telephone network, such as the Public Switched Telephone Network (PSTN), an intranet, the Internet, a memory device, or a combination of networks.

Clients 110 and servers 120, 130 may connect to network 150 via wired, wireless, and/or optical connections.

Figure 2A:
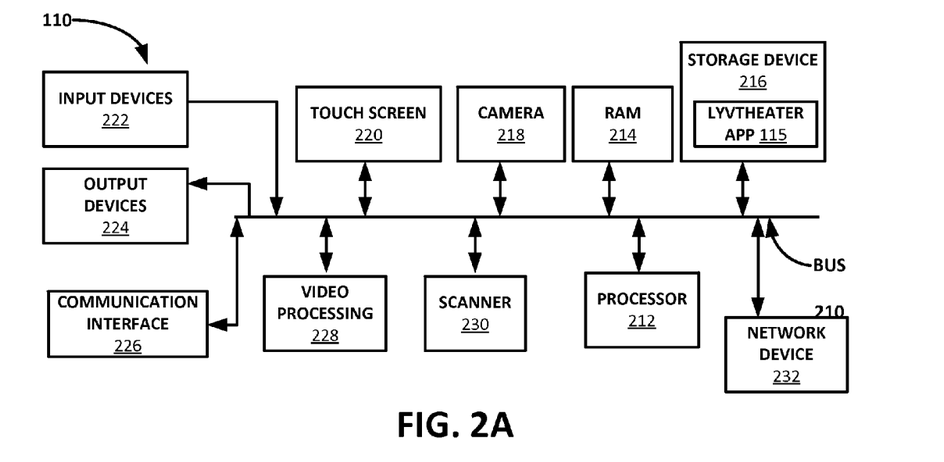
FIG. 2A is an exemplary diagram of a client of FIG. 1 according to an implementation consistent with the principles of the invention.

FIG. 2A is an exemplary diagram of a client or server, which may correspond to one or more of clients 110 and servers 120, 130, according to an implementation consistent with the principles of the invention. The client entity may include a bus 210, a processor 212, a random access memory 214, a storage device 216, a camera 218, a touch screen 220, one or more input devices 222, one or more output devices 224, a communication interface 226, and a network device 232. A Bus 210 may include one or more conductors that permit communication among the components of the client/server entity.

Processor 212 may include one or more conventional processors or microprocessors that interpret and execute instructions. Random Access memory 214 may include a dynamic storage device that stores information and instructions for execution by processor 212. Storage device 216 may include a magnetic and/or optical recording or a computer readable medium storing a program causing a computer or mobile device to execute and its corresponding drive.

Input device(s) 222 may include one or more conventional mechanisms that permit an operator to input information to the client/server entity, such as a keyboard, a mouse, a pen, voice recognition and/or biometric mechanisms, etc. Output device(s) 224 may include one or more conventional mechanisms that output information to the operator, including a display, a printer, a speaker, etc. Communication interface 226 may include any transceiver-like mechanism that enables the client/server entity to communicate with other devices and/or systems. For example, communication interface 226 may include mechanisms for communicating with another device or system via a network, such as network 150.

As it will be described in detail below, the client/server entity, consistent with the principles of the invention, booking the non-free digital event content, validating the viewer's count and their age to watch the non-free digital event content, downloading and streaming the non-free digital event content. The client entity may perform these operations in response to processor 212 executing software instructions contained in a computer-readable medium, such as storage device 216. A computer-readable medium may be defined as one or more physical or logical memory devices and/or carrier waves.

The software instructions may be read into RAM 214 from another computer-readable medium, such as data storage device 216, or from another device via communication interface 226. The software instructions contained in storage device may cause processor 212 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 2B:
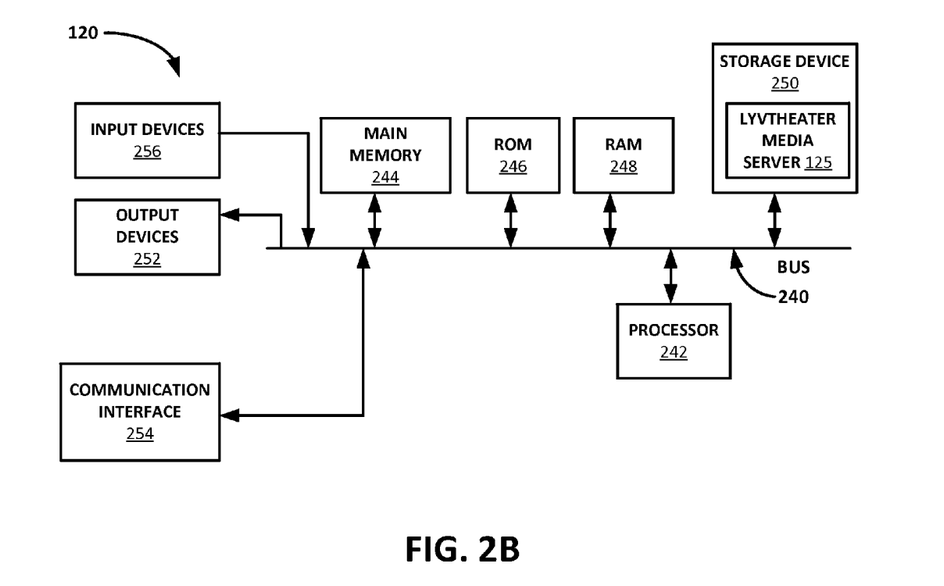
FIG. 2B is an exemplary diagram of a server of FIG. 1 according to an implementation consistent with the principles of the invention.

FIG. 2B is an exemplary diagram of a server entity, which may correspond to one or more of clients 110 and servers 120, 130, according to an implementation consistent with the principles of the invention. The server entity may include a bus 240, a processor 242, a main memory 244, a read only memory (ROM) 246, a read access memory 248, a storage device 250, one or more input devices 256, one or more output devices 252, and a communication interface 254. Bus 210 may include one or more conductors that permit communication among the components of the client/server entity.

Processor 242 may include one or more conventional processors or microprocessors that interpret and execute instructions. Main memory 244 may include a random access memory (RAM) or another type of dynamic storage device that stores information and instructions for execution by processor 242. ROM 246 may include a conventional ROM device or another type of static storage device that stores static information and instructions for use by processor 242. Storage device 250 may include a magnetic and/or optical recording medium and its corresponding drive.

Input device(s) 256 may include one or more conventional mechanisms that permit an operator to input information to the server entity, such as a keyboard, a mouse, a pen, voice recognition and/or biometric mechanisms, etc. Output device(s) 252 may include one or more conventional mechanisms that output information to the operator, including a display, a printer, a speaker, etc. Communication interface 254 may include any transceiver-like mechanism that enables the client/server entity to communicate with other devices and/or systems. For example, communication interface 254 may include mechanisms for communicating with another device or system via a network, such as network 150.

As it will be described in detail below, the server entity, consistent with the principles of the invention, perform certain searching, generating user notification with their activities, updating the user activities to their subscribed social media websites related operations. The server entity may perform these operations in response to processor 242 executing software instructions contained in a computer-readable medium, such as memory 244. A computer-readable medium may be defined as one or more physical or logical memory devices and/or carrier waves.

The software instructions may be read into memory 244 from another computer-readable medium, such as data storage device 250, or from another device via communication interface 254. The software instructions contained in memory 244 may cause processor 242 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Figure 3A:
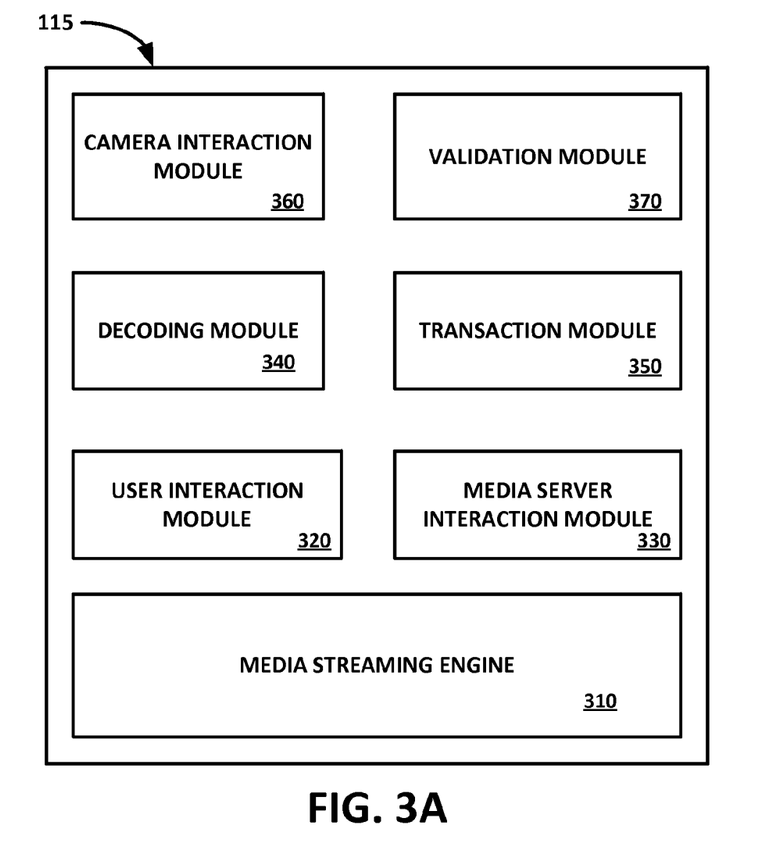
FIG. 3A is an exemplary functional block diagram of client of the present invention of FIG. 1 according to an implementation consistent with the principles of the invention.

FIG. 3A is an exemplary functional block diagram for the computer program (hereby known as "LyvTheater App") 115 that stores in the client entity 110 according to an implementation consistent with the principles of the invention. LyvTheater App 115 includes media streaming engine 310, user interaction module 320, media server interaction module 330, decoding module 340, transaction module 350, camera interaction module 360, and validation module 370.

Figure 5A:
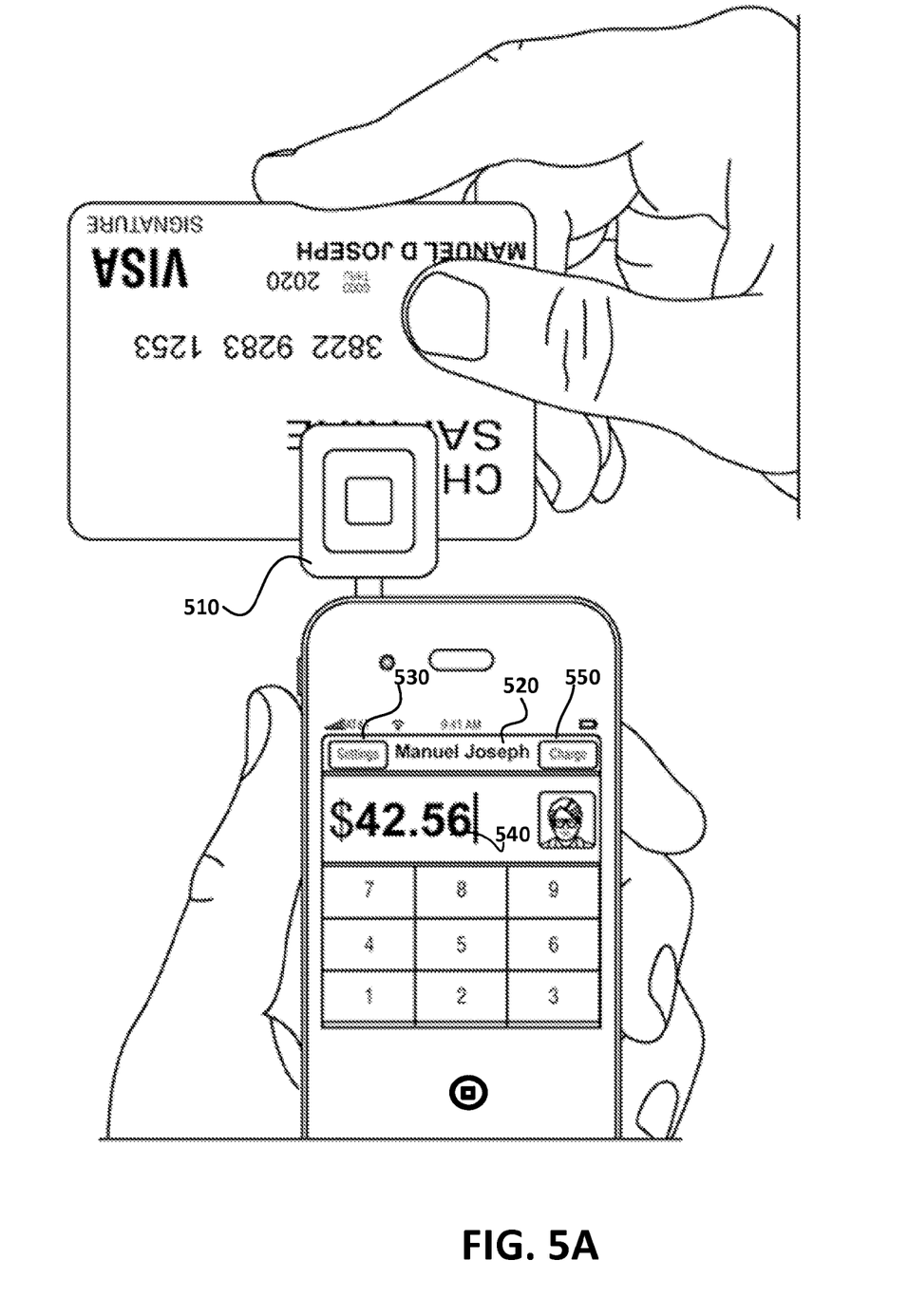
FIG. 5A shows an example of user portable handheld device having a credit card reader in use for processing the payment for the ticket amount.

Media streaming engine 310 is constantly received by and presented to an end-user's mobile device while being delivered by a Media Server component 125. User interaction module 320 provides a human-machine interaction that is the space where interaction between humans and machines occurs to collect the information about user's preferred inputs. Media server interaction module 330 provides a communication interface between client application i.e., LyvTheater App 115 and server component i.e., LyvTheater Media Server 125 and helps to download the media file for the non-free digital event content that user subscribed/paid for. The decoding module 340 is used to decrypt the user authorization code and to validate the user's identity. The transaction module 350 is providing the payment transaction operation between content provider and client device. In one of the embodiment, the transaction module 350 may leverage the card reader to read the payment card information when user swipes it in the card reader as illustrated in FIG. 5.*a*, and provides it to the payment processing module 390 of media server component 125. In another embodiment, the transaction module 350 may leverage camera device and camera interaction module 360 to scan the credit card information and process the payment. In some scenario, the LyvTheater app 115 allows the user to enter their payment information manually.

The camera interaction module 360 is used to capture the viewer's image while watching the non-free digital event content and provides it to the validation module 370. The validation module 370 is used to validate each individual viewer's age and the total viewer's count based on provided camera image. During the process of validation, the validation module 370 validates whether the viewer's are eligible to watch the paid non-free digital event content and if they have purchased enough tickets to watch the non-free digital event content.

Figure 3B:
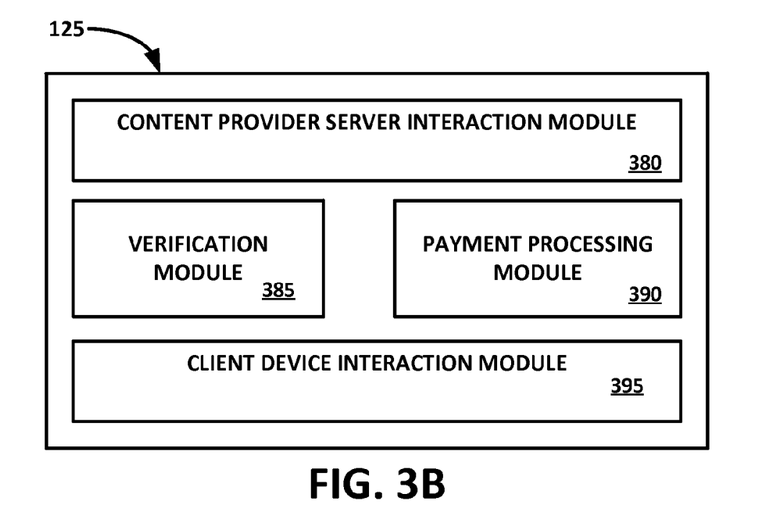
FIG. 3B is an exemplary functional block diagram of server of the present invention of FIG. 1 according to an implementation consistent with the principles of the invention.

FIG. 3B is an exemplary functional block diagram for the computer program (hereby known as "LyvTheater Media Server") 125 that stores in the server entity 120 or 130 according to an implementation consistent with the principles of the invention. LyvTheater Media Server 125 includes Content Provider server interaction module 380, verification module 385, payment processing module 390, and client device interaction module 395. The Content Provider server interaction module 380 is used to establish the communication between LyvTheater media server 125 and Content Provider server 130 to book the tickets on behalf of users and to stream the non-free digital event content in the client device 110. Verification module 385 is used to verify the viewer's identify based on the provided 6-digit authorization code.

Figure 4:
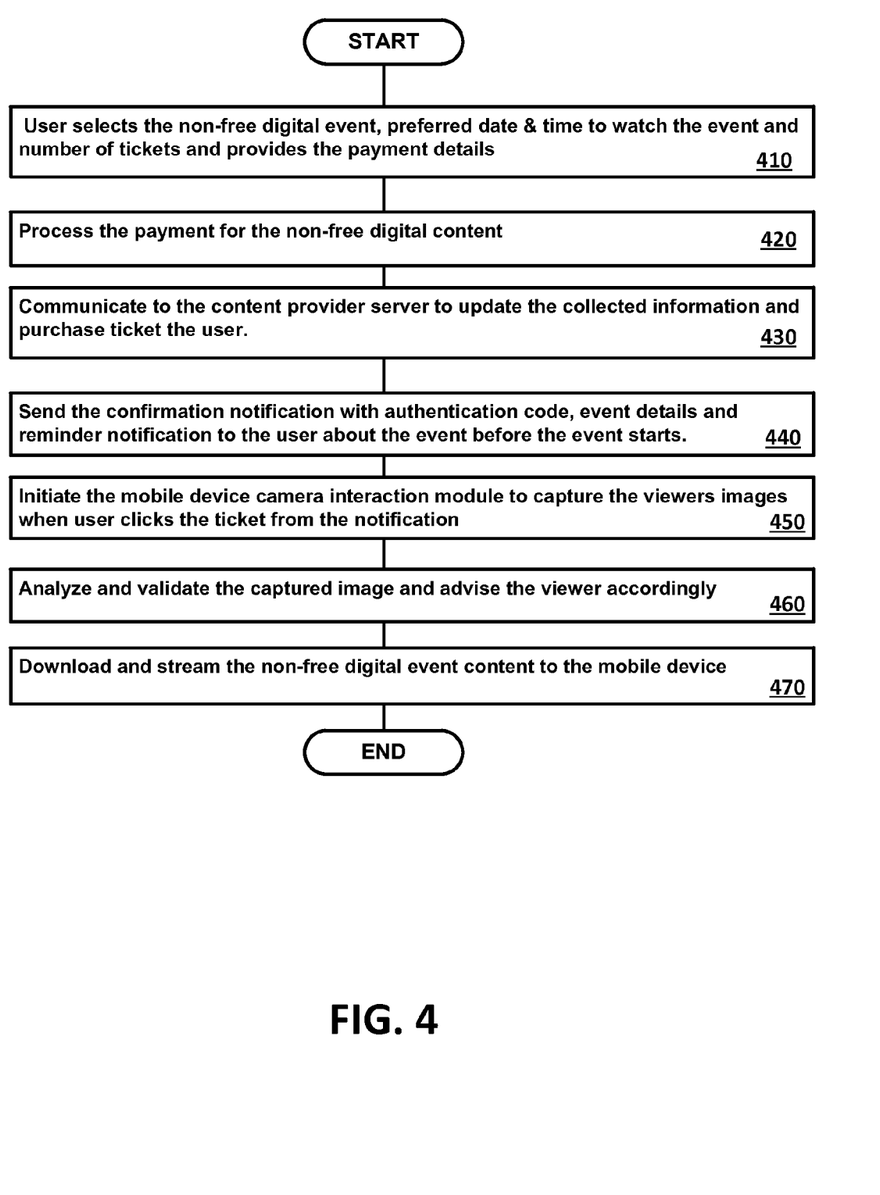
FIG. 4 is a flowchart of exemplary processing for providing the digital content of non-free event to viewers through mobile computing devices on their preferred date and time according to an implementation consistent with the principles of the invention.

In operation, as shown in FIG. 4, the present invention provides User interface where user selects the non-free digital event, preferred date & time to watch the event and number of tickets along with payment details as mentioned in the act 410. In some scenario, the LyvThear app 115 may provide the card reader to read the payment details from the user. In another scenario, the LyvTheater app 115 may reads the payment card information from user by scanning the payment source using user's mobile device camera. Also, it may provide user the ability to provide payment details manually. The collected User details are sent to the LyvTheater media server 125 for further processing. In act 420, the present invention processes the payment for the non-free digital event through the transaction and payment processing modules in LyvTheater media server. In act 430, the present invention communicates to the Content Provider server to update the collected user details and the purchased ticket details for the user.

As mentioned in the act 440, the present invention sends the confirmation notification to the user to their mobile device in form of E-Ticket. The confirmation notice comprises of 6-digit hexadecimal code as the authentication code, along with details about the non-free digital event. The present invention also sends reminder notification to the user about the event before the event starts.

As a validation step mentioned in act 450, the present invention initiates the mobile device camera interaction module to capture the image of all viewers in the vicinity when user clicks the ticket from the notification. In act 460, the present invention analyzes and validates the captured image from the camera and notifies the user if the number of tickets purchased and the number of viewers do not match and advises the user to buy additional tickets to watch the event. Similarly if the viewers age is not appropriate for the event based on the event rating, the present invention notifies the user the event is inappropriate for the audience. In act 470, the present invention downloads and streams the non-free digital event content to their mobile device by using media streaming engine.

FIG. 5A. illustrates the exemplary graphical user interface of one of the embodiment for payment method of LyvTheater app that provides ability for users to pay for the tickets using swipe card interface. In another embodiment the users may buy the tickets of non-free digital event content and pay for the tickets by using the mobile device camera for scanning their payment source such as credit card, debit card, check, etc. The transaction module 350 of LyvTheater app 115 leverages the Card Interface to read the user's card information and displays details of transaction in the payment processing screen as shown in the FIG. 5. a. The LyvTheater app 115 displays the name on the credit card 520, amount 540 to charge along with ability to change the payment processing methods using settings 530. In another embodiment the present invention may provide an ability to user to enter the payment details manually.

Figure 5B:
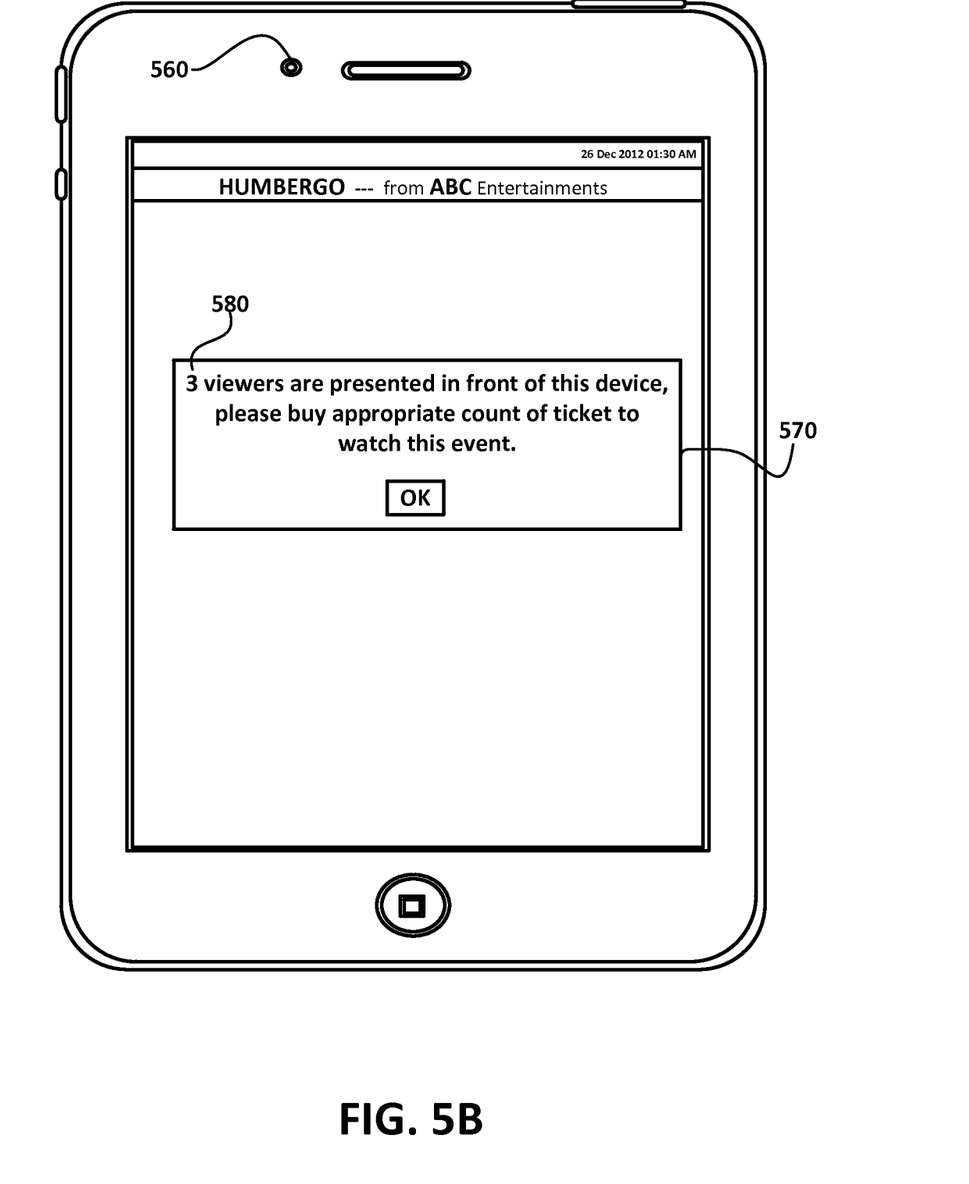
FIG. 5B is an exemplary interface illustrating a method which leverage camera device to validate the number viewer count and the credentials of the viewer in accordance with an embodiment of the present invention.
Figure 5C:
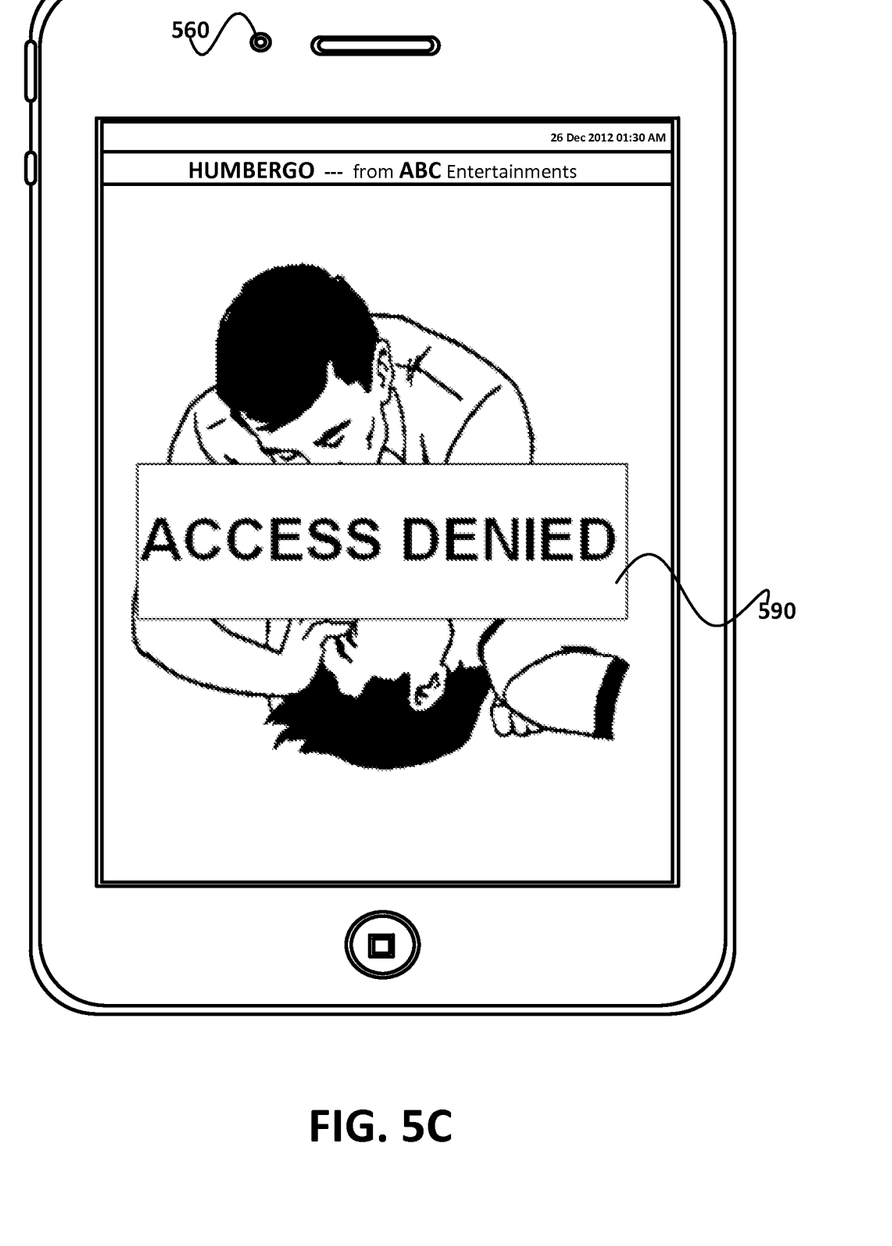
FIG. 5C is illustrating a method for validating a viewer is in right age to watch the event in accordance with an embodiment of the present invention.

FIG. 5B illustrates the exemplary user interface of LvyTheater app 115 displaying a pop-up message 570 as 3 members are presented in front of the camera device 560 but user has purchased lesser number of tickets. Hence, the LyvTheater app 115 displays to buy correct count of tickets before streaming the non-free digital event content. The LyvTheater app 115 leverages the camera 560 device to continuously record the objects presented in front of the camera 560 device. The image of recorded objects is being validated to identify the number of humans presented in front of the mobile device and calculates the age of the presented humans. The age is being used to validate whether the presented human is eligible to watch the non-free digital event content that may be designated for mature audiences as some event material like sex, violence, substance abuse, profanity, impudence may be in appropriate for younger audience as shown in FIG. 5C.

Figure 6:
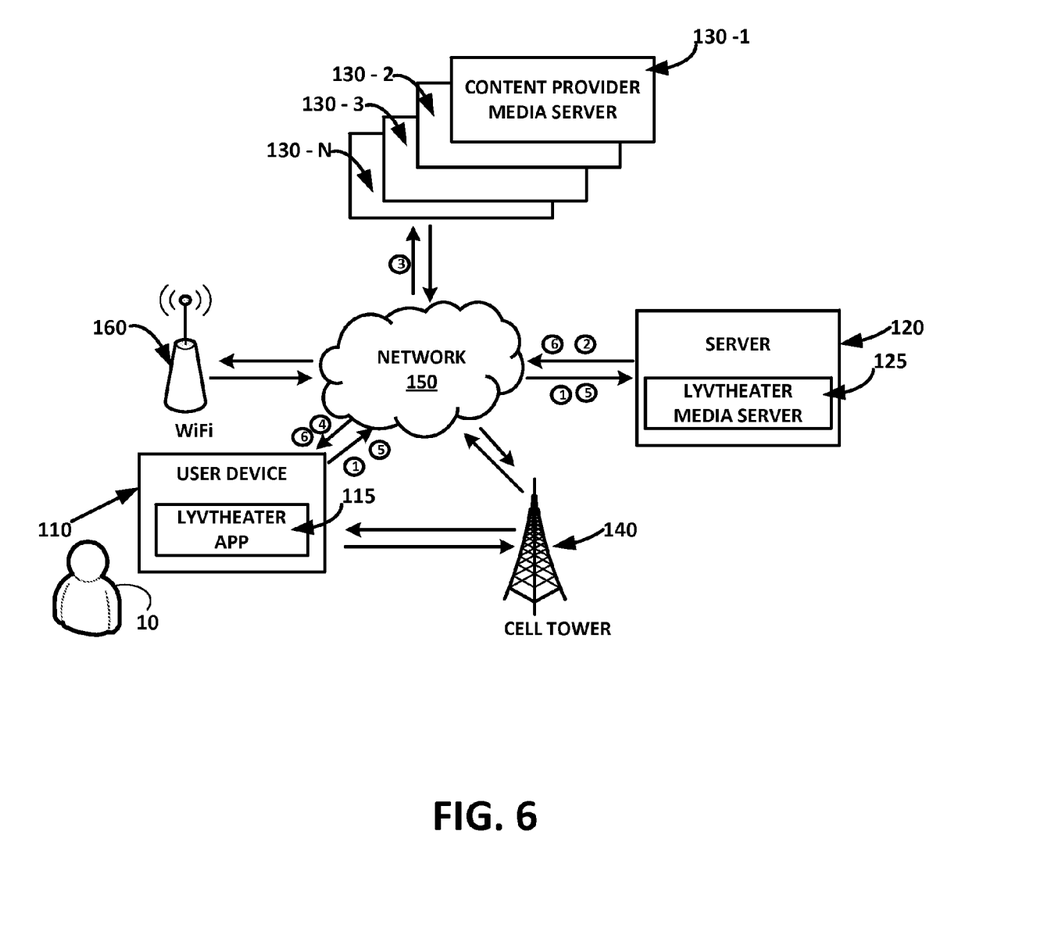
FIG. 6 is illustrating the operational sequence of present invention of FIG. 1 according to an implementation consistent with the principles of the invention.

The FIG. 6 illustrates the exemplary operational sequence of present invention. As illustrated in the sequence 1, user 10 opens a LyvTheater app 115 from his/her mobile device 110. The LvyTheater app 115 downloads the non-free digital event content titles, prices and content provider information and shows them in the display screen of the mobile device 110. The user 10 selects the non-free digital event content title, number of tickets, content provider and desired date & time to watch the selected non-free digital event. The collected information from user 10 is being sent to the server 120 via cell tower 140 and network 150. In some scenario, the LyvTheater app 115 may uses the WiFi 160 and network 150 to send the collected information to the server 120.

In Sequence 2, the LyvTheater Media Server 125 receives the request from mobile device 110 and processes the request and payment received. Then LyvTheater Media Server 125 communicates to the user's 10 desired Content Provider Media Server 130-1 . . . , 130-N to book the tickets. Content Provider Media Server process the request, payment for the tickets and sends the non-free digital event content along with 6-digit ticket authentication code to the LyvTheater Media Server 125 as mentioned in the sequence 3.

As mentioned in the sequence step 4, the LyvTheater Media Server 125 sends a notification to the mobile device 110 with 6-digit authentication code to watch the non-free digital event content. When its time to watch the user may click the notification to initiate the operation as shown in sequence 5. In another scenario user may open the LyvTheater app 115 from his mobile device and click on the scheduled event to initiate the viewing process. At the time of watching the non-free digital event content, the LyvTheater app 115 prompts the viewers to enter the 6-digit authentication code to initiate the streaming. Once the authentication code is validated then LyvTheater app 115 initiates the mobile device 110 camera to record the objects presented in front of the camera device. As shown in FIG. 3a the LyvTheater app 115 leverages the Camera Interaction Module 360 to capture the viewer's image and validates the viewer's age, and count for the tickets purchased by using validation module 370. At sequence 6, once the validation is successful the non-free digital event content is being downloaded from the server 120 and streaming it in the user computing device 110 using LyvTheater app 115.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching. The embodiments were chosen and described in order to best explain the principles of the present invention and its practical application. Although the present invention has been described with reference to particular embodiments, it will be apparent to those skilled in the art that variations and modifications can be substituted without departing from the principles and spirit of the invention.

For example, while series of acts have been described with regard to FIG. 4, the order of the acts may be modified in other implementations consistent with the principles of the invention. Further, non-dependent acts may be performed in parallel.

Some portions of above description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Upon reading this disclosure, those of skill in the art will appreciate still additional alternative structural and functional designs for a device independent communications platform.

Thus, while particular embodiments and applications have been illustrated and described, it is to be understood that the disclosure is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

I claim:

1. A method for streaming non-free digital event content from a plurality of content provider media servers to mobile computing devices at users preferred date and time and ensuring mobile computing device users are in appropriate age having right number of tickets along with a 6 digit hexadecimal authentication code to watch the non-free digital event content, the method comprising:
    providing transaction computer implemented program module which is capable of reading user payment information utilizing card reader and/or mobile computing camera device to allow a plurality of users to purchase a plurality of tickets for preferred non-free digital event from a plurality of content provider media servers for preferred date and time to watch the event;
    providing decode computer implemented program module which is capable of acquiring authentication code from a ticket utilizing mobile computing camera device and/or optical character recognition technology to validate a plurality of users identity for the non-free digital event content by authorizing a provided authentication code;
    providing camera interaction computer implemented program module which is capable of interact with mobile computing camera device to capture a plurality of objects image that are presented in front of plurality of mobile computing devices camera vicinity;
    providing validation computer implemented program module which is capable of determining age of objects presented in the mobile computing devices camera vicinity area utilizing mobile computing camera device to ensure that a number of objects age according to content rating of non-free digital event;
    providing media streaming engine computer implemented program module to download viewers preferred non-free digital event content from content provider media servers and streaming the non-free digital event content to touchscreen display of mobile computing device.

2. The method according to claim 1, wherein said authentication code is 6-digit hexadecimal code generated by a content provider media server.

3. The method according to claim 1, wherein said objects are group of people who presented in front of mobile computing device camera vicinity.

4. The method according to claim 1, wherein said mobile computing device comprises at least one of:
    a personal digital assistant,
    a smart phone,
    a mobile,
    a tablet computer,
    a computerized wristwatch,
    a wearable computer,
    a Handheld device,
    a MP3 player,
    a handheld gaming device.

5. The method according to claim 1, wherein said content provider media server is to provide the non-free digital event content.

6. The method according to claim 1, wherein said non-free digital event content comprises at least one of:
- audio content,
- video content,
- movie content,
- a broadcast,
- a digital broadband broadcast,
- a video,
- an audio,
- a movie,
- a streaming audio,
- a streaming video,
- streaming content,
- a live event,
- a sporting event,
- a news event,
- an entertainment event,
- a concert,
- a show,
- a performance,
- a movie,
- an awards show,
- an online event,
- a game,
- a video game,
- a business to business seminar,
- a seminar,
- an organizational meeting,
- a conference,
- a video conference,
- a multi-tiered tournament,
- an interview.

7. A computer readable storage medium having program code stored thereon, the program code including instructions that, when executed by a processor in a mobile device, cause the processor to perform operations for streaming non-free digital event content from a plurality of content provider media servers to mobile computing devices at users preferred date and time and ensuring mobile computing device users are in appropriate age having right number of tickets along with a 6 digit hexadecimal authentication code to watch the non-free digital event content, the operation comprising:
- providing transaction computer implemented program module which is capable of reading user payment information utilizing card reader and/or mobile computing camera device to allow a plurality of users to purchase a plurality of tickets for preferred non-free digital event from a plurality of content provider media servers for preferred date and time to watch the event;
- providing decode computer implemented program module which is capable of acquiring authentication code from a ticket utilizing mobile computing camera device and/or optical character recognition technology to validate a plurality of users identity for the non-free digital event content by authorizing a provided authentication code;
- providing camera interaction computer implemented program module which is capable of interact with mobile computing camera device to capture a plurality of objects image that are presented in front of plurality of mobile computing devices camera vicinity;
- providing validation computer implemented program module which is capable of determining age of objects presented in the mobile computing devices camera vicinity area utilizing mobile computing camera device to ensure that a number of objects age according to content rating of non-free digital event;
- providing media streaming engine computer implemented program module to download viewers preferred non-free digital event content from content provider media servers and streaming the non-free digital event content to touchscreen display of mobile computing device.

8. The computer program product of claim 7, wherein said authentication code is 6-digit hexadecimal code generated by a content provider media server.

9. The computer program product of claim 7, wherein said objects are group of people who presented in front of mobile computing device camera vicinity.

10. The computer program product of claim 7, wherein said mobile computing device comprises at least one of
- a personal digital assistant,
- a smart phone,
- a tablet computer,
- a computerized wristwatch,
- a wearable computer,
- a Handheld device,
- a MP3 player,
- a handheld gaming device.

11. The computer program product of claim 7, wherein said content provider media server is to provide the non-free digital event content.

12. The computer program product of claim 7, wherein said non-free digital event content comprises at least one of:
- audio content,
- video content,
- movie content,
- a broadcast,
- a digital broadband broadcast,
- a video,
- an audio,
- a movie,
- a streaming audio,
- a streaming video,
- streaming content,
- a live event,
- a sporting event,
- a news event,
- an entertainment event,
- a concert,
- a show,
- a performance,
- a movie,
- an awards show,
- an online event,
- a game,
- a video game,
- a business to business seminar,
- a seminar,
- an organizational meeting,
- a conference,
- a video conference,
- a multi-tiered tournament,
- an interview.

13. A user mobile computing device, comprising:
- memory configured to store a plurality of data objects; and
- one or more processors configured to
- perform operations for streaming non-free digital event content from a plurality of content provider media servers
- to mobile computing devices at users preferred date and time and ensuring mobile computing device users are in appropriate age having right number of tickets along with a 6 digit hexadecimal authentication code to watch the non-free digital event content, the operation comprising:

providing transaction computer implemented program module which is capable of reading user payment information utilizing card reader and/or mobile computing camera device to allow a plurality of users to purchase a plurality of tickets for preferred non-free digital event from a plurality of content provider media servers for preferred date and time to watch the event;

providing decode computer implemented program module which is capable of acquiring authentication code from a ticket utilizing mobile computing camera device and/or optical character recognition technology to validate a plurality of users identity for the non-free digital event content by authorizing a provided authentication code;

providing camera interaction computer implemented program module which is capable of interact with mobile computing camera device to capture a plurality of objects image that are presented in front of plurality of mobile computing devices camera vicinity;

providing validation computer implemented program module which is capable of determining age of objects presented in the mobile computing devices camera vicinity area utilizing mobile computing camera device to ensure that a number of objects age according to content rating of non-free digital event;

providing media streaming engine computer implemented program module to download viewers preferred non-free digital event content from content provider media servers and streaming the non-free digital event content to touchscreen display of mobile computing device.

14. The user mobile computing device of claim 13, wherein said authentication code is 6-digit hexadecimal code generated by a content provider media server.

15. The user mobile computing device of claim 13, wherein said objects are group of people who presented in front of user mobile computing device camera vicinity.

16. The user mobile computing device of claim 13, wherein said content provider media server is to provide the non-free digital event content.

17. The user mobile computing device of claim 13, wherein said non-free digital event content comprises at least one of:
audio content,
video content,
movie content,
a broadcast,
a digital broadband broadcast,
a video,
an audio,
a movie,
a streaming audio,
a streaming video,
streaming content,
a live event,
a sporting event,
a news event,
an entertainment event,
a concert,
a show,
a performance,
a movie,
an awards show,
an online event,
a game,
a video game,
a business to business seminar,
a seminar,
an organizational meeting,
a conference,
a video conference,
a multi-tiered tournament,
an interview.

* * * * *